(12) United States Patent
Haggans

(10) Patent No.: US 7,356,259 B1
(45) Date of Patent: Apr. 8, 2008

(54) OPTICAL BYPASS UPGRADE CONFIGURATION

(75) Inventor: Charles Haggans, Clarksville, MD (US)

(73) Assignee: Ciena Corporation, Linthicum, MD (US)

( * ) Notice: Subject to any disclaimer, the term of this patent is extended or adjusted under 35 U.S.C. 154(b) by 653 days.

(21) Appl. No.: 10/868,835

(22) Filed: Jun. 17, 2004

Related U.S. Application Data

(60) Provisional application No. 60/479,181, filed on Jun. 18, 2003.

(51) Int. Cl.
*H04J 14/02* (2006.01)

(52) U.S. Cl. .......................... 398/83; 398/45; 398/79; 398/82; 398/84; 398/85; 398/59; 398/50; 398/52; 398/53; 398/56; 398/58; 398/48; 398/49; 398/46; 398/2; 398/3; 398/4; 398/5; 398/173; 398/175; 385/24; 385/37; 385/16; 385/17; 385/18

(58) Field of Classification Search ................... 398/83, 398/82, 79, 84, 85, 45, 46, 48, 50, 56, 55, 398/52, 2, 3, 4, 5, 6, 7, 59, 58, 53, 49, 175, 398/173; 385/24, 37, 16, 17, 18

See application file for complete search history.

(56) References Cited

U.S. PATENT DOCUMENTS

| 6,272,154 | B1 * | 8/2001 | Bala et al. .................. 370/535 |
| 6,999,681 | B2 * | 2/2006 | Gruber et al. ................. 398/50 |
| 7,133,616 | B2 * | 11/2006 | Caroli .......................... 398/83 |

* cited by examiner

*Primary Examiner*—Hanh Phan
(74) *Attorney, Agent, or Firm*—Clements Bernard Miller; Christopher L. Bernard; Tyler S. Brown

(57) ABSTRACT

Optical bypass node upgrade configurations are disclosed: (1) a configuration where optical taps are pre-positioned in wavelength division multiplex (WDM) line systems terminating at optical-electrical-optical (OEO) core switching nodes to allow for future upgrade of the nodes to degree-two or higher optical bypass; (2) a configuration where the taps are pre-positioned in a degree-two optical bypass node to allow for future upgrade to a degree-N optical bypass node; and (3) a configuration and procedure for upgrading OEO core switching nodes to optical bypass when the taps have not been pre-positioned in the WDM line systems. These configurations do not introduce bit errors for non-upgraded optical paths.

36 Claims, 15 Drawing Sheets

OPTICAL BYPASS UPGRADE CONFIGURATION

PROVISIONAL APPLICATION

The present application claims priority under 35 U.S.C. § 120 of a provisional application 60/479,181 filed on Jun. 18, 2003, the entirety of which is hereby incorporated by reference.

FIELD OF THE INVENTION

The field of the invention generally relates to optical networks. More particularly, the field of the invention is directed to a optical configuration that enables optical bypasses to occur without disrupting flow of information.

BACKGROUND OF THE INVENTION

Optical networks provide a tremendous capacity advantage. Entities wishing to take advantage of the advantages that optical networks offer, must usually make a decision based on their current needs (which may be modest and predictable) and their future needs (which are typically unpredictable). An entity may decide to acquire a network to meet its short-term needs because of the entity's present financial constraints.

However, this approach carries a risk that the network will be insufficient and may cost more in the long run because the entire network has to be replaced due to inadequacies of the network. Also, any upgrades may require the network to be shut down prior to the upgrade. Such a shut down is costly since no service can be provided, which in turn shuts down a revenue stream. In an industry like telecommunications, a shut down can be extremely costly.

Another approach is to project a long-term need and acquire a network with capabilities to meet the long-term need. This approach also carries inherent risks as well. In the short run, the investment in the network will be wasted to the extent that there will be excess capacity. In the long run, the needs of the entity may change in a different direction and the acquired network will not be able to handle the changed needs efficiently.

Current optical networks typically consist of a collection of point-to-point wavelength division multiplex (WDM) links with optical-electrical-optical (OEO) switches or regeneration sites providing interconnections between links. FIG. 1 is an example of a conventional optical network 100. The optical network 100 includes a collection of OEO nodes (for example, nodes 102, 104, and 106) and regeneration sites (for example, 108).

Not all of the optical traffic flowing into an OEO node is destined for that node. For example, some of the optical traffic flowing from the OEO node 102 into the OEO node 104 may actually be destined for the OEO node 106. However, due to the configuration of the conventional optical network 100, and in particular due to the configuration of the conventional OEO node, all optical signals flowing into the OEO node undergo optical to electrical conversion and all signals flowing out of the OEO node undergo electrical to optical conversion. Thus, the optical signal traffic from the node 102 to the node 106 via the node 104 undergoes optical-electrical-optical conversion at the OEO node 104.

As the amount of express traffic (traffic that is not terminated or regenerated at a node) increases, it becomes cost effective to keep these channels in the optical domain and bypass the OEO switches. This functionality is termed optical bypass.

It is anticipated that the movement to networks with optical bypass will take place gradually by enhancement of existing networks, rather than through builds of complete all-optical networks. In particular, it is expected that bypass capability will only be added to a particular node when the express traffic through that node reaches a capacity level where bypass implementation is cost effective.

It will be very important to carriers to not take down existing traffic terminating at the OEO nodes as the upgrade to optical bypass takes place. Thus, it is very desirable to have a modular upgrade path so that networks OEO nodes and regeneration elements can be upgraded in a hitless fashion in the future.

An approach is desired where the system deployed is extremely flexible so that future demands on the optical networks, not yet foreseen, may be handled with ease. As the capacity demand grows and changes, it is desirable to provide a flexible system that can meet the increased demand and the type of demand changes. It is also desirable to have the capability to recover previously inaccessible capacity and without service disruptions.

BRIEF DESCRIPTION OF THE FIGURES

Features of the present invention will become more fully understood to those skilled in the art from the detailed description given herein below with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically connects" or "optically communicates" as used herein refers to any connection, coupling, link or the like by which optical signals carried by one optical element are imparted to the "connecting element." Such "optically communicating" devices are not necessarily directly connected to one another and may be separated by intermediate optical components and/or devices. Likewise, the expressions "connection", "operative connection", and "optically placed" as used herein are relative terms and do not necessarily require a direct physical connection.

Figure 1:
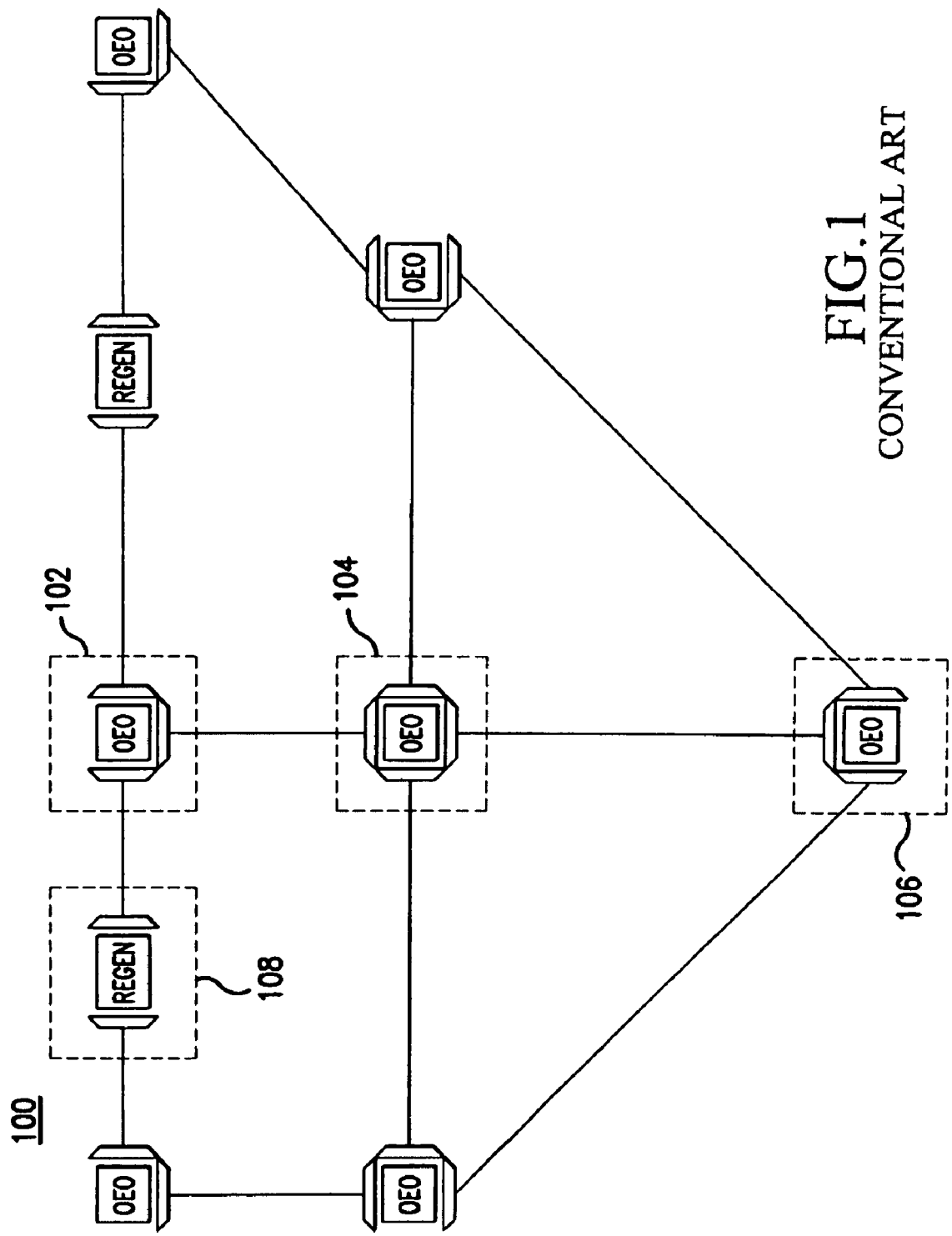
FIG. 1 illustrates a conventional optical network with conventional optical nodes and regeneration sites.
Figure 2:
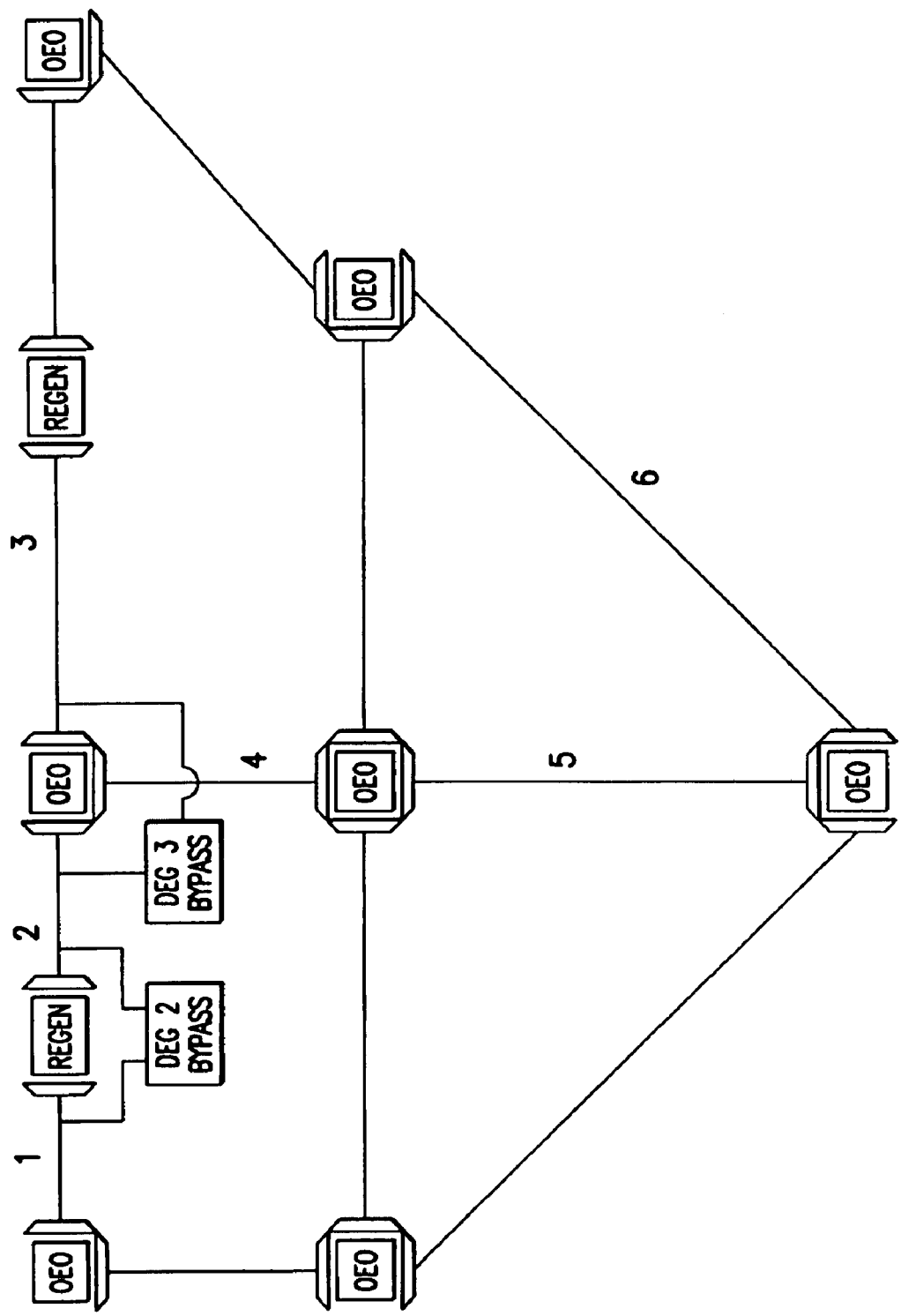
FIG. 2 illustrates a first stage bypass-enabled network.
Figure 3:
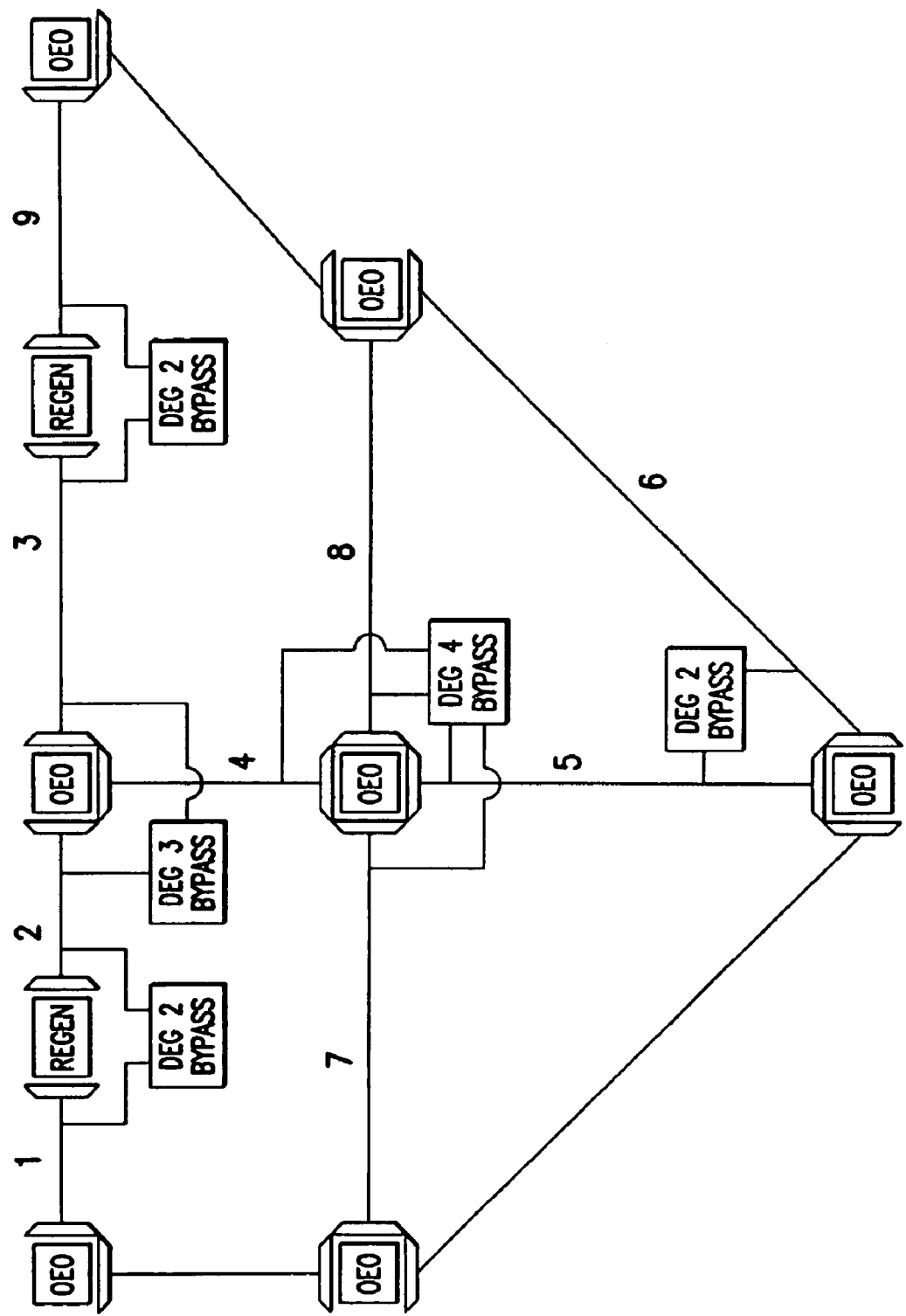
FIG. 3 illustrates a second stage bypass-enabled network.

An example of how optical bypass might be implemented into an existing network is detailed utilizing FIGS. 2 and 3. FIG. 2 illustrates an example of a first stage bypass and FIG. 3 illustrates an example of a second stage bypass. In the first stage of an optical bypass implementation, bypasses are added at certain high capacity junction points so small star networks with all-optical connectivity (no regenerations) are enabled (segments 1-4 and 5-6 in FIG. 2).

In the second phase of bypass upgrade as shown in FIG. 3, bypasses are added to nodes where it did not exist (e.g., the addition of segment 9 to segments 1-4), and nodes with partial bypass are upgraded (e.g., the addition of segments 7 and 8 to connect the two previously enabled transparent domains).

Figure 4:
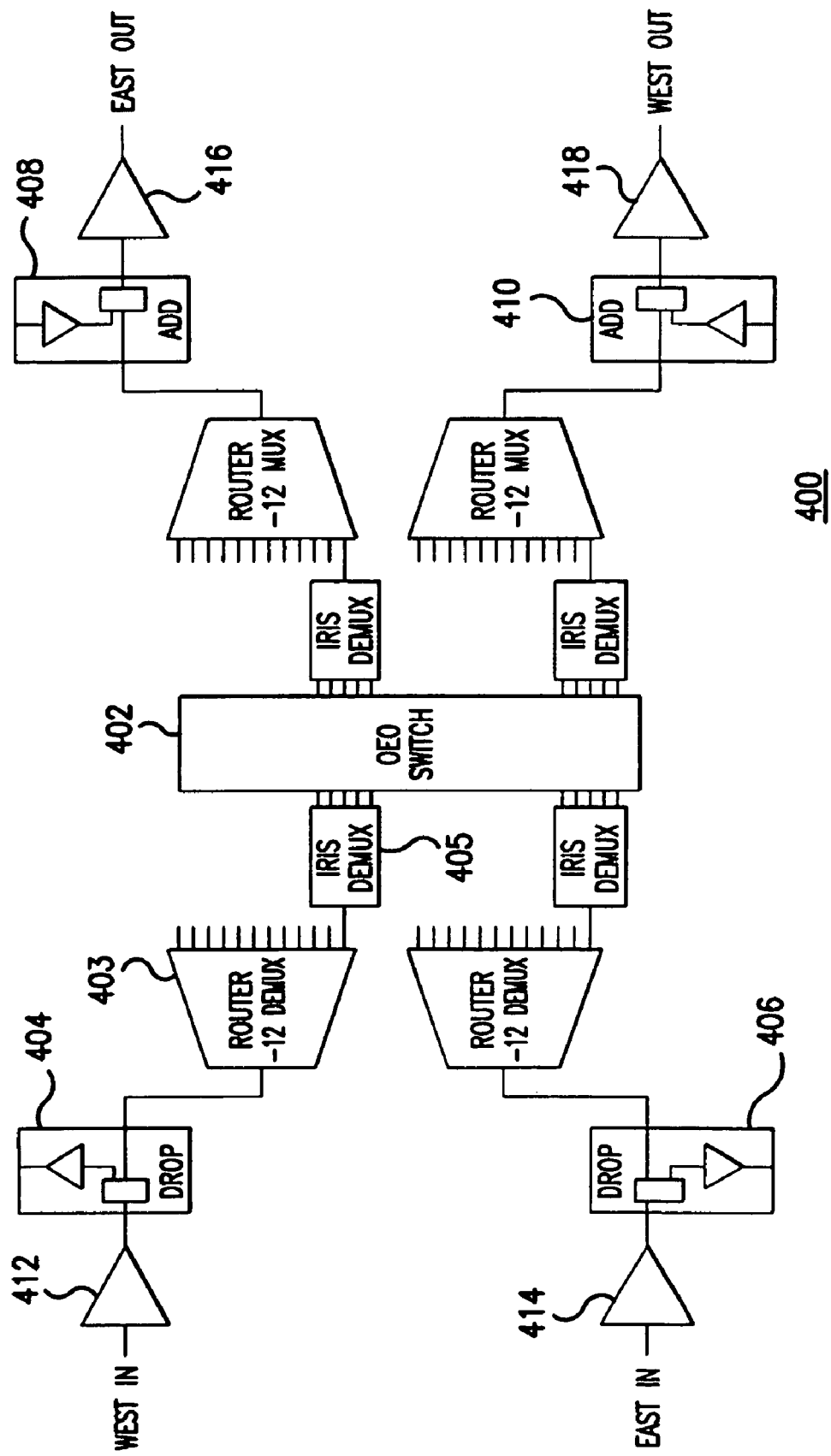
FIG. 4 illustrates an optical-electrical-optical (OEO) node with a bypass configuration according to an embodiment of the invention.

FIG. 4 illustrates an optical-electrical-optical node 400 according to an embodiment of the present invention. The configuration of the OEO node 400 is such that add and drop taps are provisioned to enable bypass upgrades in the future without the necessity of disrupting the traffic flow. In other words, with configuration of the OEO node 400, the network need not be brought down when the future upgrade takes place.

FIG. 4 illustrates a degree-2 OEO node, e.g. an optical node with two inputs. However, the scope of the invention is not limited to degree-2 nodes only.

The OEO node 400 includes an OEO switch 402. The example OEO switch 402 includes a plurality of inputs (for example, first and second inputs) that optically communicate with a corresponding plurality of drop taps (for example, first and second drop taps 404, 406) through a plurality of two-stage demux/mux scheme. For example, the optical signals from the West In source are provided to the first input of the OEO switch 402 via the first drop tap 404.

Figure 5A:
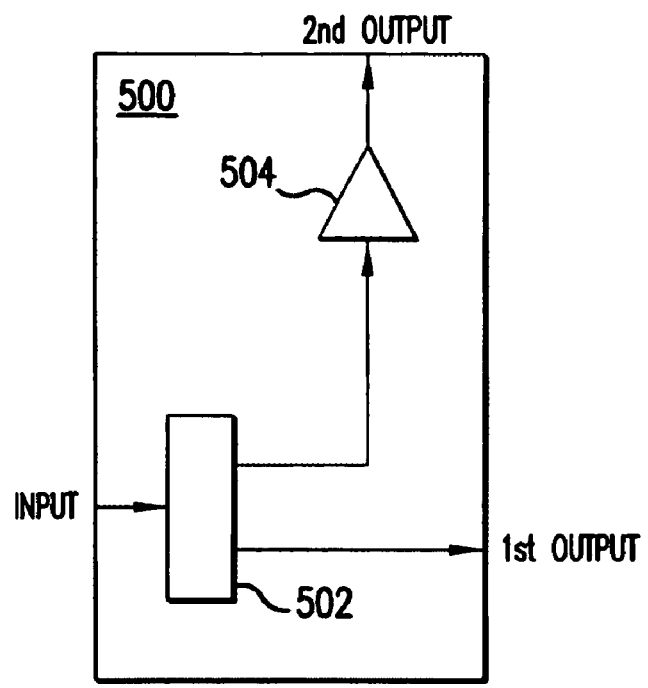
FIGS. 5A and 5B illustrate drop taps according to embodiments of the present invention.
Figure 5B:
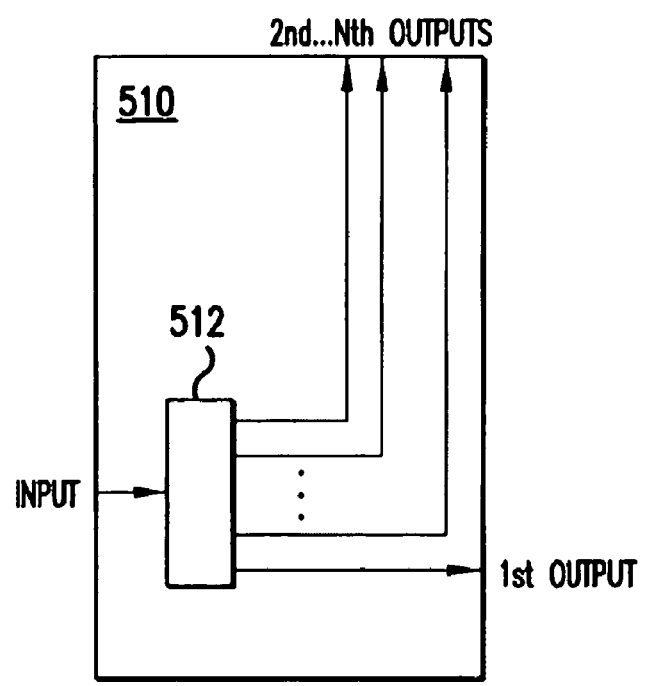

Each of the first and second drop taps 404 and 406 may be drop taps 500, 510 of the type as illustrated in FIGS. 5A and 5B. A drop tap may include an input and a plurality of outputs. For example, the drop tap 500 as shown in FIG. 5A includes an input and first and second outputs. The drop tap 510 as shown in FIG. 5B also includes and input and a plurality of outputs (including first and second outputs). Each drop tap 500, 510 may be configured to direct optical signals present at its input to each of the outputs including the first and second outputs.

The drop tap 500, 510 may include an optical splitter 502, 512 (or simply "splitter") configured to direct optical signals present at its input to its plurality of outputs. For example, the splitter 502 of the drop tap 500 (see FIG. 5A) directs optical signals present at its input to its first and second outputs. The splitter 512 (see FIG. 5B) also directs optical signals from its input to its plurality of outputs, including the first and second outputs.

The input of the splitter 502, 512 may optically communicate with the input of the drop tap 500, 510. Indeed, the input of the of the splitter 502, 512 may serve as the input of the drop tap 500, 510. Likewise, the plurality of outputs of the drop tap 502, 512 including the first and second outputs, may optically communicate with the corresponding outputs of the drop tap 500, 510, and may indeed serve as the corresponding outputs of the drop tap 500, 510.

The splitter 502, 512 may be configured to deliver differing amounts of power to the outputs. For example, the splitter 502 of the drop tap 500 may direct a majority of output power to the first output of the splitter 502, and consequently to the first output of the drop tap 500. Generally, low insertion loss on one path is desirable to minimize the number of amplifiers used for the bypass configuration. Indeed, the splitter 502, 512 may be such that the amount of power directed to each of the outputs is dynamically tunable.

The drop tap may also include a line amplifier to amplify optical signals from its input to its output. Examples of line amplifiers include EDFA (erbium doped fiber amplifier), SoA (semiconductor optical amplifier), and other gain media and optically active materials.

For example, the drop tap 500 may include a line amplifier 504 with its input optically communicating with the second output of the splitter 502 and its output optically communicating with the second output of the drop tap 500. This may be useful in circumstances wherein the amount of optical power of the source is low. For example, this may occur if the splitter 502 is configured to direct a majority of output power to the first output, and consequently delivers only a small amount of power to its second output.

While not specifically shown, it should be noted that any of the inputs and outputs of the splitter 502 and/or 512 may be optically connected with a line amplifier as desired.

Referring back to FIG. 4, the input of the first and second drop taps 404, 406 may optically communicate external optical signal sources (West In and East In, respectively) and the first outputs of the of the first and second drop taps 404, 406 may optically communicate with the first and second inputs of the OEO switch 402, respectively. While the drop taps 404, 406 are illustrated as being of the type shown in FIG. 5A, this is not strictly necessary. One or both of the drop taps 404, 406 may also be of the type as shown in FIG. 5B.

Note that the labels "West In, East In, West Out, and East Out" are for the convenience of labeling the different sources and destinations of optical signals. The labels do not necessarily indicate the actual direction of flow of the optical signals.

Also, while the multiplexing and demultiplexing scheme of the optical signals flowing into and out of the OEO switch 402 illustrated is a two-stage design, the actual scheme of multiplexing and demultiplexing utilized is not limited to this. Any generic multiplexing and demultiplexing scheme surrounding the OEO switch 402 may be used without departing from the scope of the invention.

The example OEO switch 402 may also include a plurality of outputs (for example, first and second outputs) that optically communicate with a corresponding plurality of add taps (for example, first and second add taps 408, 410) through a plurality of two-stage demux/mux scheme. For example, the East Out destination is provided with optical signals first output of the OEO switch 402 via the first add tap 408.

Figure 6A:
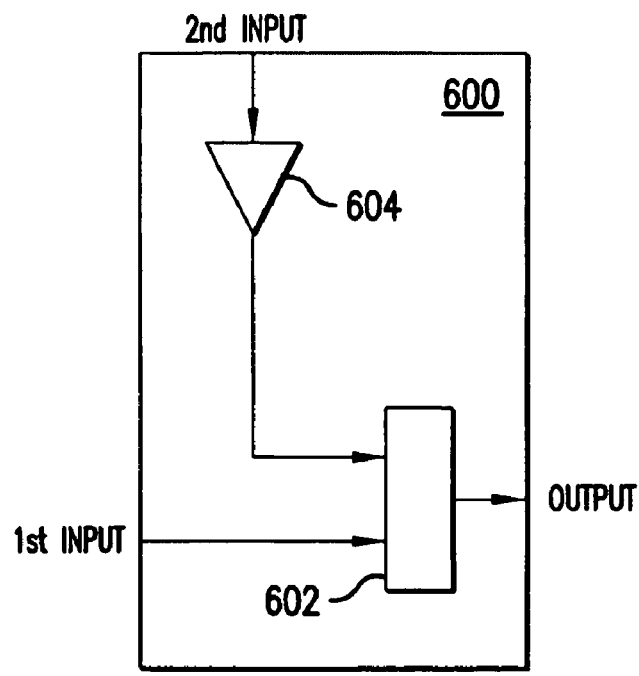
FIGS. 6A and 6B illustrate add taps according to embodiments of the present invention.
Figure 6B:
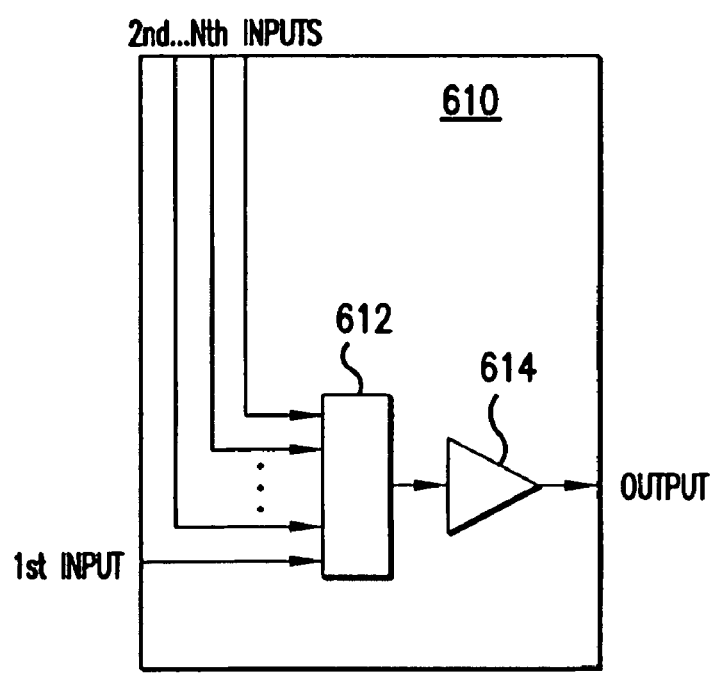

Each of the first and second add taps 408 and 410 may be add taps 600, 610 of the type as illustrated in FIGS. 6A and 6B. An add tap may include a plurality of inputs and an output. For example, the add tap 600 as shown in FIG. 6A includes a first and second inputs and an output. The add tap 610 as shown in FIG. 6B also includes a plurality of inputs (including first and second inputs) and an output. Each add tap 600, 610 may be configured to direct optical signals present at each of its plurality of inputs to its output.

The add tap 600, 610 may include an optical combiner 602, 612 (or simply "combiner") configured to direct optical signals present at its plurality of inputs to its output. For example, the combiner 602 of the add tap 600 (see FIG. 6A) directs optical signals present at its first and second inputs to its output. The combiner 612 (see FIG. 5B) also directs optical signals from its plurality of inputs to its output, including from the first and second inputs.

The output of the combiner 602, 612 may optically communicate with the output of the add tap 600, 610. Indeed, the output of the of the combiner 602, 612 may serve as the output of the add tap 600, 610. Likewise, the plurality of inputs of the add tap 602, 612 including the first and second inputs, may optically communicate with the corresponding inputs of the add tap 600, 610, and may indeed serve as the corresponding inputs of the add tap 600, 610.

The combiner 602, 612 may be configured to deliver differing amounts of power from each of the inputs to the output. Indeed, the combiner 602, 612 may be such that the amount of power directed to from each of the inputs to the output is dynamically tunable.

The add tap may also include a line amplifier to amplify optical signals from its input to its output. For example, the add tap 600 may include a line amplifier 604 with its input optically communicating with the second input of the add tap 600 its output optically communicating with the second input of the combiner 602. This may be useful in circumstances wherein the amount of optical power delivered to the second input of the add tap 600 is low.

The line amplifier may also be utilized to amplify the output signal from the combiner. For example, the add tap 610 may include a line amplifier 614 with its input optically communicating with the output of the combiner 612 and its output optically communicating with the output of the add tap 610.

While not specifically shown, it should be noted that any of the inputs and outputs of the combiner 602 and/or 612 may be optically connected with a line amplifier as desired.

Referring back to FIG. 4, the output of the first and second add taps 408, 410 may optically communicate external optical signal destinations (East Out and West Out, respectively) and the first inputs of the of the first and second add taps 408, 410 may optically communicate with the first and second outputs of the OEO switch 402, respectively. While the add taps 408, 410 are illustrated as being of the type shown in FIG. 6A, this is not strictly necessary. One or both of the add taps 408, 410 may also be of the type as shown in FIG. 6B.

The OEO node 400 may also include in-line amplifiers optically communicating with the optical drop taps. The in-line amplifier may configured to amplify optical signals present at its input and direct the amplified signals to its output.

In this instance, as illustrated in FIG. 4, the outputs of the first and second in-line amplifiers 412, 414 may optically communicate with the inputs of the first and second drop taps 404, 406, respectively. Also, the inputs of the first and second in-line amplifiers 412, 414 optically communicate with the external optical signal sources West In and East In, respectively.

It should be noted that the in-line amplifiers 412, 414 are optional. In other words, the in-line amplifiers 412, 414 are not necessary for the OEO node 400 to operate.

The OEO node 400 may further include boost amplifiers optically communicating with the optical add taps. The boost amplifier may configured to amplify optical signals present at its input and direct the amplified signals to its output.

In this instance, as shown in FIG. 4, the inputs of the first and second boost amplifiers 416, 418 may optically communicate with the outputs of the first and second add taps 408, 410, respectively. Also, the outputs of the first and second boost amplifiers 416, 418 optically communicate with the external optical signal destinations East Out and West Out, respectively.

It should be noted that the boost amplifiers 416, 418 are optional. In other words, the boost amplifiers 416, 418 are not necessary for the OEO node 400 to operate.

Figure 7:
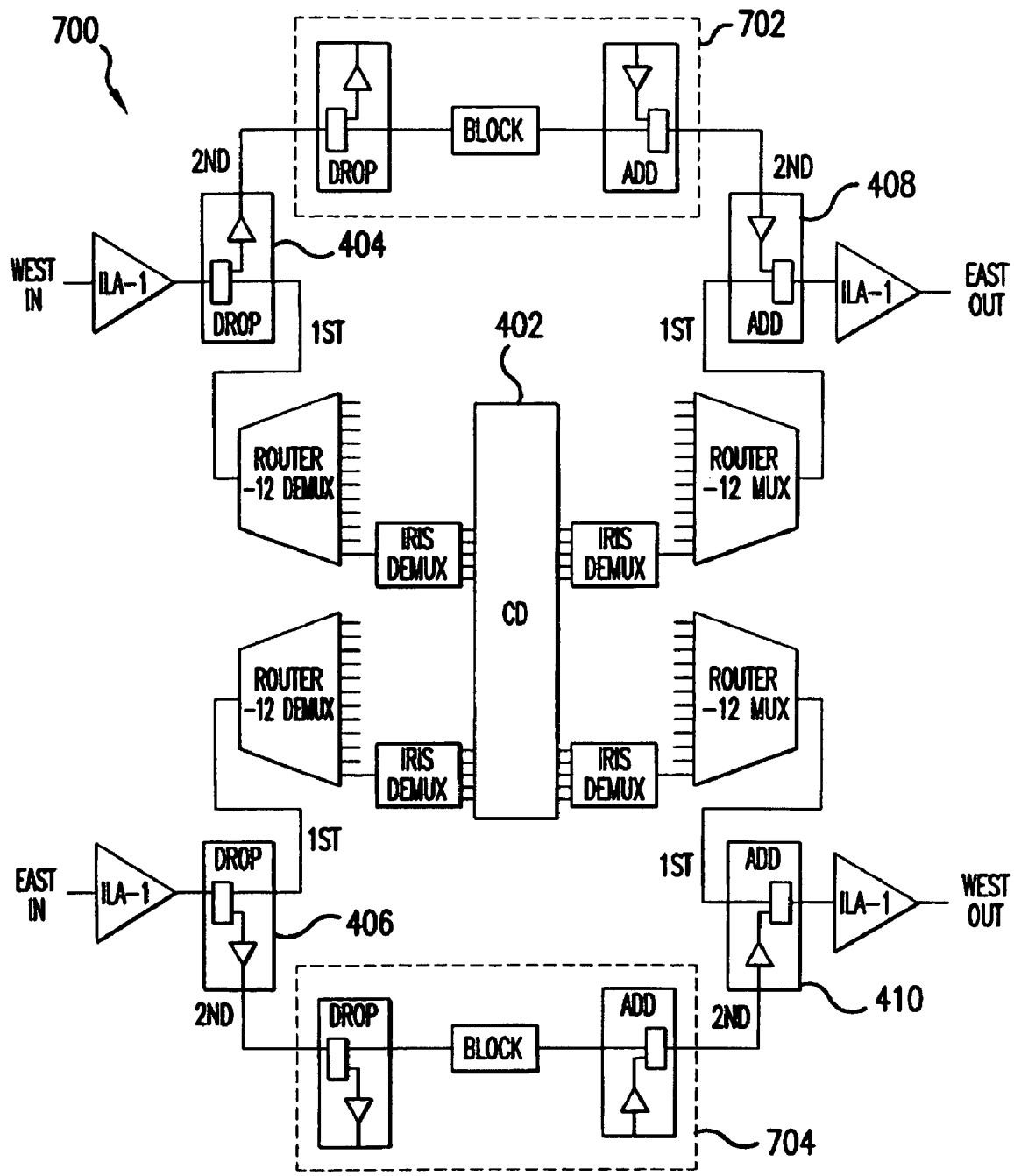
FIGS. 7 and 7A illustrate an upgrade of an OEO node to a higher degree OEO node according to an embodiment of the present invention.

As mentioned previously, the configuration of the OEO node in FIG. 4 allows for bypass upgrades to take place without the need to bring down the network or other wise disrupt the network. FIG. 7 illustrates an embodiment of the present invention that includes additional elements that enables an upgrade to take place. In this example, either one or both of first and second bypass devices 702, 704 may be inserted.

Figure 7A:
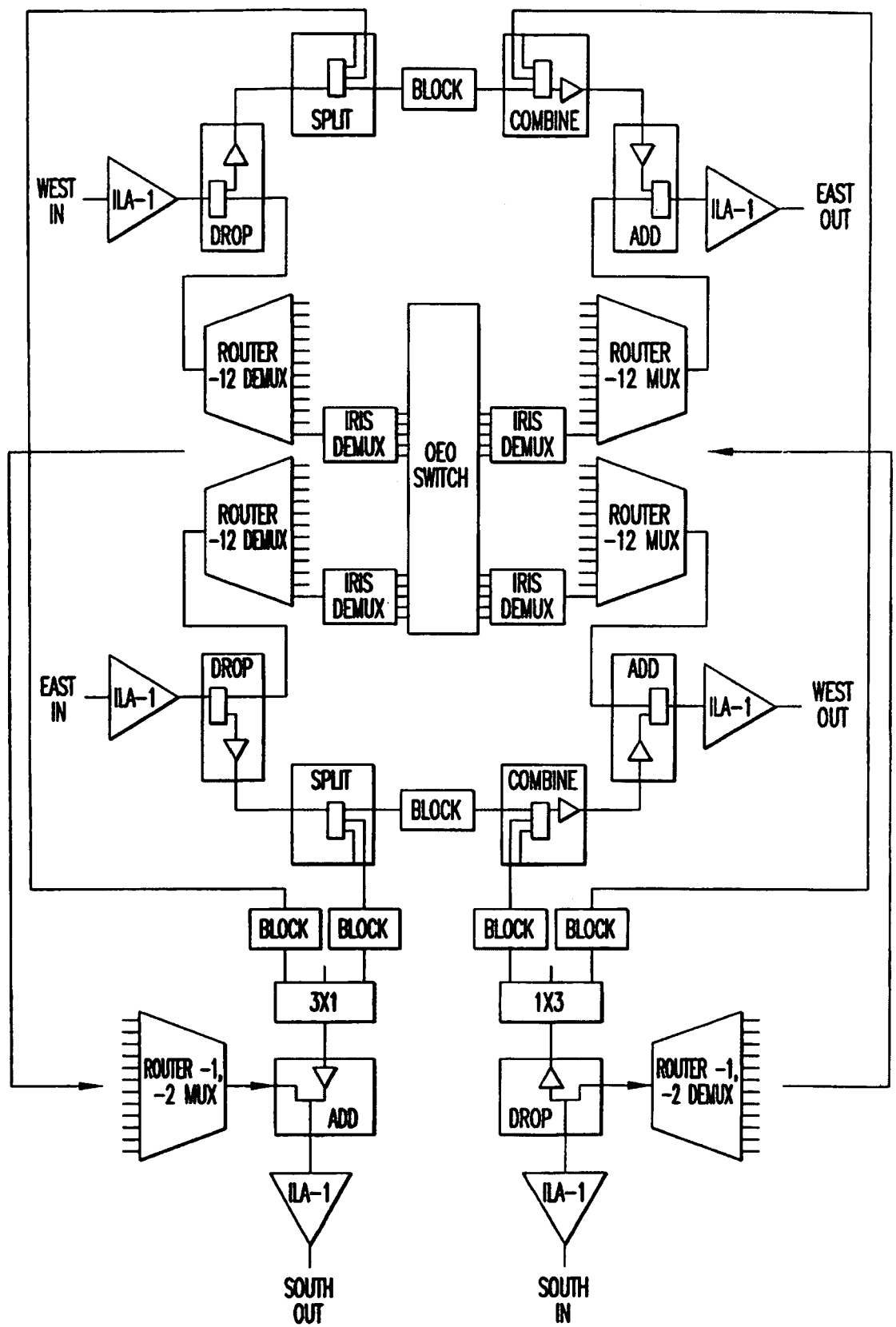

FIG. 7A illustrates an example of a completed upgrade from a degree-2 node to a degree-3 node. While FIGS. 7 and 7A illustrate an upgrade from a degree-2 node, a node of any degree may be upgraded to a node of higher degree by the proper insertion and connection of the bypass devices.

Figure 8:
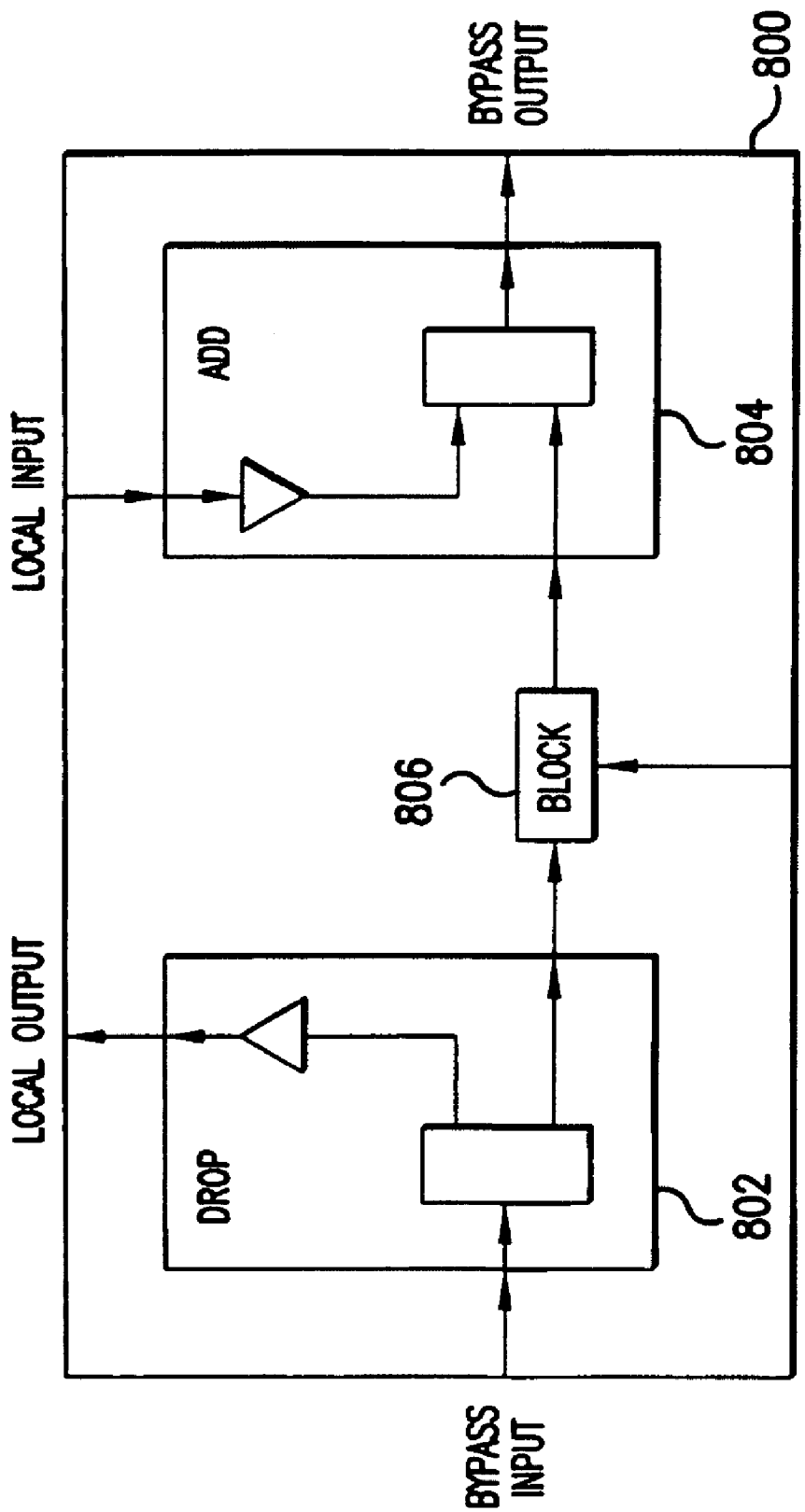
FIG. 8 illustrates a bypass device according to an embodiment of the present invention.

One or both of the first and second bypass devices 702, 704 may of the type of a bypass device 800 illustrated in FIG. 8. The bypass device 800 may include a bypass input, a bypass output, a local output (or a "future-use-bypass output"), and a local input (or a "future-use-bypass input"). The bypass device 800 may be configured to direct zero more optical channels present at its bypass input to its bypass output, direct all optical channels present at its bypass input to its local output, and direct all optical channels present at its local input to its bypass output.

Referring back to FIG. 7, the bypass input of the first bypass device 702 may optically communicate with the second output of the first drop tap 404 and the bypass output of the first bypass device 702 may optically communicate with the second input of the first add tap 408.

Similarly, the bypass input of the second bypass device 704 may optically communicate with the second output of the second drop tap 406 and the bypass output of the second bypass device 706 may optically communicate with the second input of the second add tap 410.

It can be easily seen that the configuration of the OEO node 400 of FIG. 4 allows an upgrade to the node 700 of FIG. 7 to take place without having the network traffic being disrupted. As shown, the optical signal traffic from sources West In and East In to the OEO switch 402 and the optical signal traffic from the OEO switch 402 to the East Out and West Out destinations need not in disrupted while the upgrade takes place. This is due to the provisioning of extra drop outputs of the first and second drop taps 404, 406 and the extra inputs of the first and second add taps 408, 410.

Note that after the upgrade with the bypass devices 702, 704 is completed, further upgrades are possible without disruption in the flow of information due to the provisioning of the future-use-bypass inputs and outputs.

Either or both of the bypass devices 702, 704 may be of the type of a bypass device 800 as illustrated in FIG. 8. In FIG. 8, the bypass device 800 may include a drop tap 802 or an add tap 804 or both. In this instance, the drop tap 802 is presented to be of the type of drop tap 500 as illustrated in FIG. 5A. However, while not shown, the drop tap 802 may also be of type of drop tap 510 as illustrated in FIG. 5B. Likewise, while the add tap 804 is presented as being of the type of add tap 600 as illustrated in FIG. 6A, the drop tap 610 as illustrated in FIG. 6B may also be utilized.

As illustrated in FIG. 8, if the drop tap 802 may be present in one or both of the first and second bypass devices 702, 704, the bypass device 800 may be configured such that the input of the drop tap 802 optically communicates with the bypass input of the bypass device 800 and the second output of the drop tap 802 optically communicates with the local output of the bypass device 800. The first output of the drop tap 802 may optically communicate with the output of the bypass device 800 via a block filter 806 and/or the add tap 804.

Also if the add tap 804 is present in either or both of the first and second bypass devices 702, 704, the bypass device 800 may be configured such that the output of the add tap 804 optically communicates with the output of the bypass device 800 and the second input of the add tap 804 optically communicates with the local input of the bypass device 800. The first input of the add tap 804 may optically communicate with the input of the bypass device 800 via a block filter 806 and/or the drop tap 802.

Optionally, the bypass device 800 may include a blocking filter 806 configured to direct a subset of optical channels (or wavelengths) presented at its input to its output and block the remaining channels from being transferred.

Figure 9:
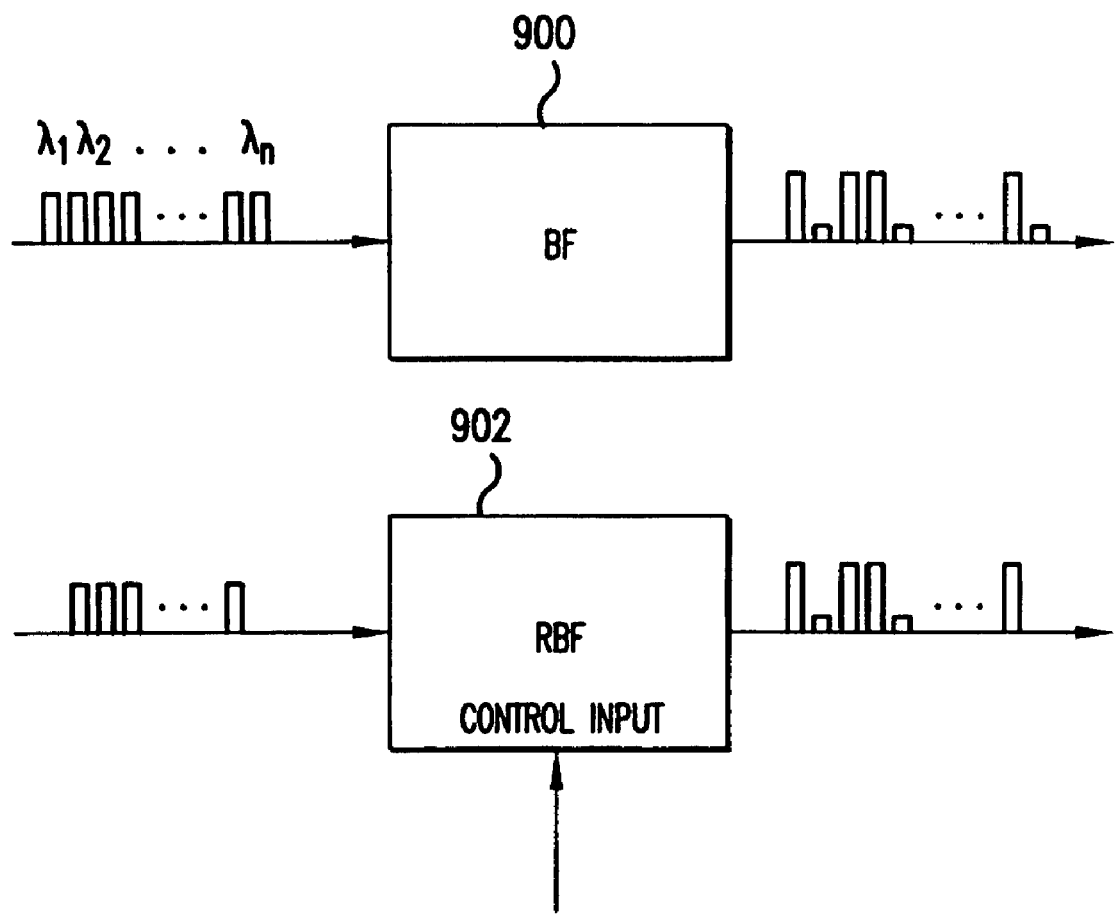
FIG. 9 illustrates blocking filters according to an embodiment of the present invention.

FIG. 9 illustrates examples of blocking filters according to an embodiment of the present invention. As noted, each blocking filter 900, 902 may receive optical channels $\lambda_1 \ldots \lambda_n$ at its input. However, the blocking filter 900, 902 severely attenuates (or blocks) optical signals of certain channels while allowing other subset of optical channels to pass through without much attenuation. Blocking filter 902 is a reconfigurable blocking filter and includes a control input. Through the use of the control input, the channels of optical signals selected for blocking may be dynamically tunable. Examples of optical channel blocking technology may be found in U.S. Pat. Nos. 6,141,361; 5,974,207; 6,625,346; 6,687,431 or the like.

Referring back to FIG. 8, the input of the blocking filter 806 may optically communicate with the bypass input of the bypass device 800. The optical communication may take place via the first output of the drop tap 802 if the drop tap 802 is present. Similarly, the output of the blocking filter 806 may optically communicate with the bypass output of the bypass device 800. The optical communication may take place via the first input of the add tap 804 if the add tap 804 is present.

Figure 10:
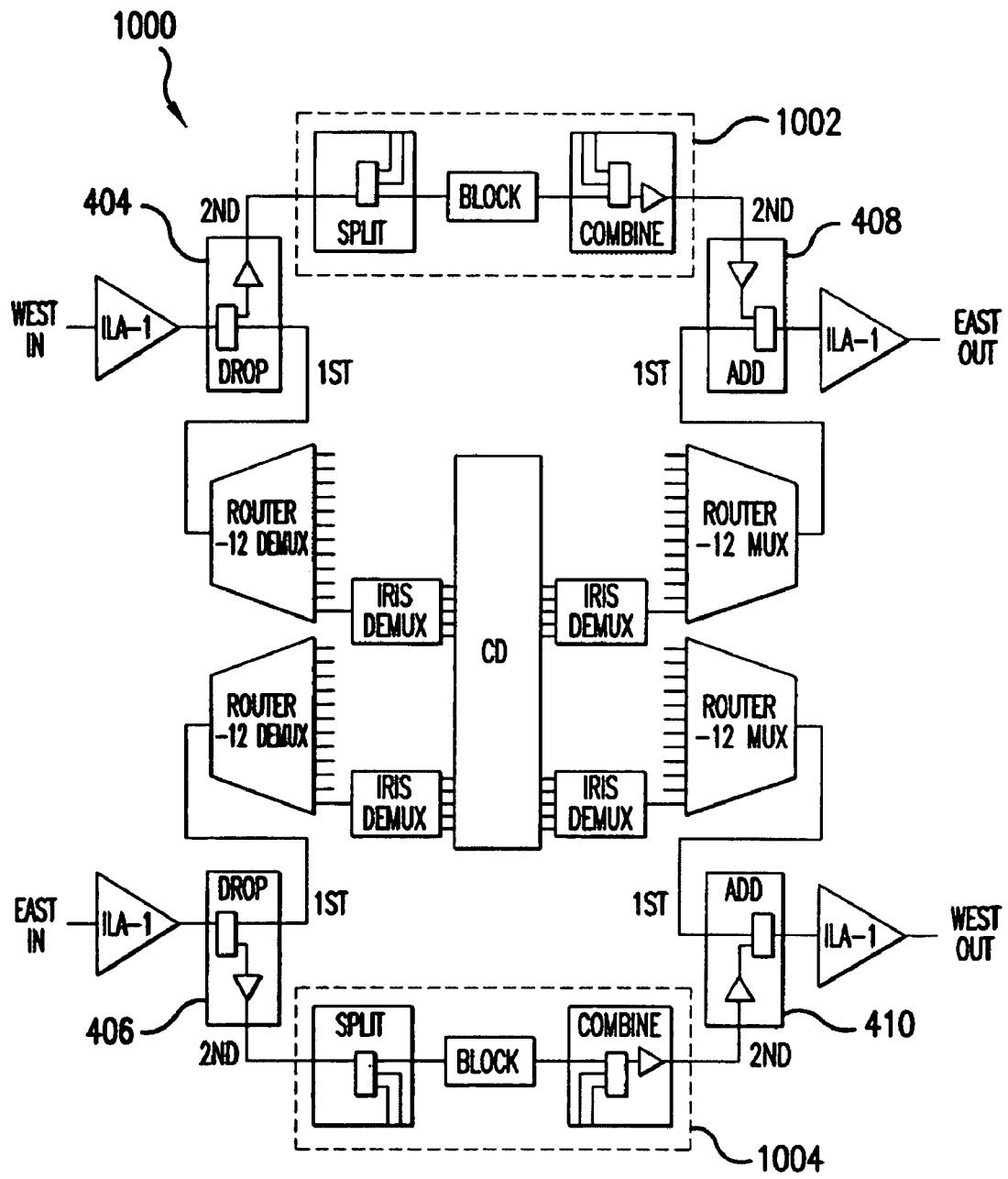
FIG. 10 illustrates a variant of an upgrade of an OEO node to a higher degree OEO node an embodiment of the present invention.

As noted above, the drop tap 802 may be of the type of drop tap 500, 510 and the add tap 804 may be of the type of add tap 600, 610. That is, the drop tap 802 may include an optical splitter and may also include line amplifier(s). Likewise, the add tap 804 may include a combiner and line amplifier(s). The details of the drop and add taps have already been described with references to FIGS. 5A, 5B, 6A, and 6B and thus need not be repeated here. An example of an OEO node 1000 with bypass devices 1002, 1004 that includes drop taps 510 and add taps 610 is illustrated in FIG. 10.

Thus, the method of upgrading an OEO node to a higher degree OEO node where the original OEO node has been pre-enabled for bypass upgrade (for example from OEO node 400 of FIG. 4 to the OEO 700 node of FIG. 7 or to OEO node 1000 of FIG. 10) simply requires inserting the appropriate bypass device and making proper optical connections. In this embodiment, the bypass device 702, 704 may be of the type of bypass device 800 as shown in FIG. 8.

Referring back to FIG. 7, the bypass device 702, 704 may be inserted such that the bypass input of the bypass device 702, 704 optically communicates with the bypass drop output (the second output of the optical drop tap 404, 406) of the OEO node 400. Also, the bypass output of the bypass device 702, 704 may optically communicate with the bypass add input (the second input of the optical add taps 408, 410) of the OEO node 400. The method may include adjusting the selection of optical channels to be directed from the bypass input to the bypass output of the bypass device 702, 704, for example, through configuring the blocking filter 806.

It may not always the case where an OEO node has been provisioned for non-disruptive bypass upgrades. When such non-provisioned system undergoes an upgrade, a bypass insertion apparatus may be utilized so that any future bypass upgrades may be performed in a non-disruptive manner.

Figure 11:
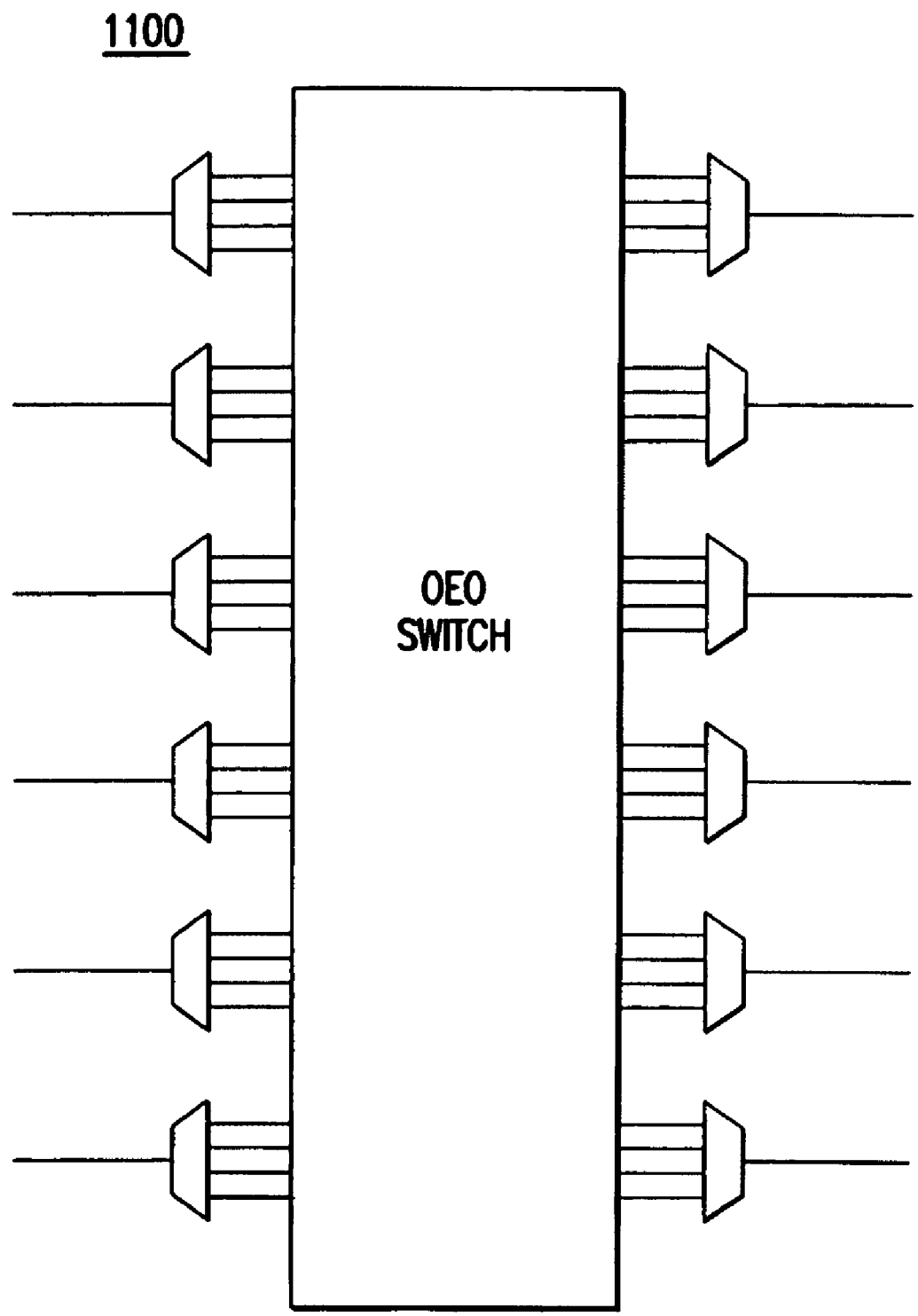
FIGS. 11 and 11A illustrate an upgrade of a preexisting OEO node to a node that will enable future upgrades in a non-disruptive manner according to an embodiment of the present invention.

FIG. 11 illustrates an example of an existing OEO node 1100 with no provisions for non-disruptive upgrades. The OEO node 1100 may be upgraded with a bypass insertion device 1200 so that future upgrades to the node 1100 may take place in a non-disruptive manner (see FIG. 11A).

Figure 11A:
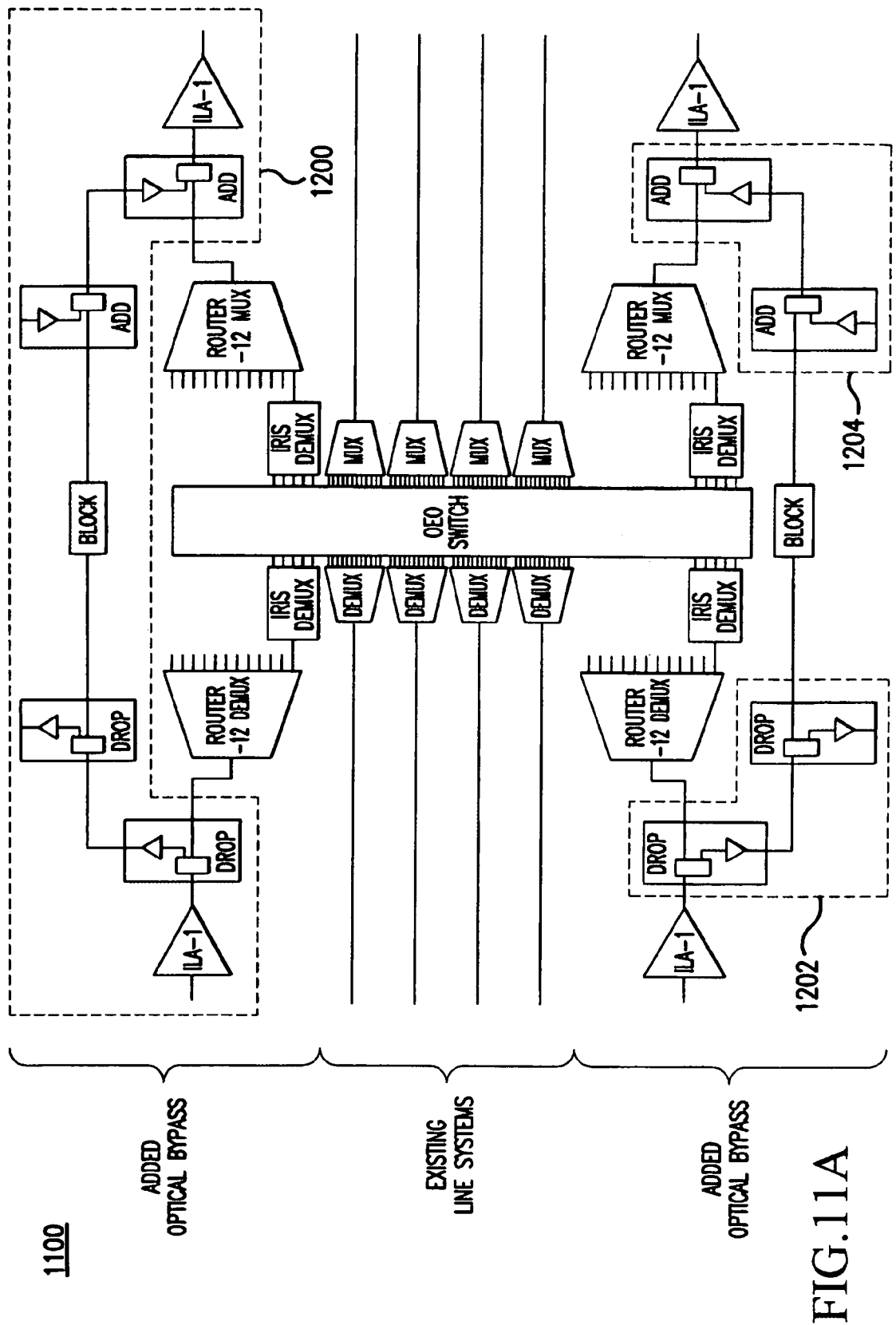
Figure 12:
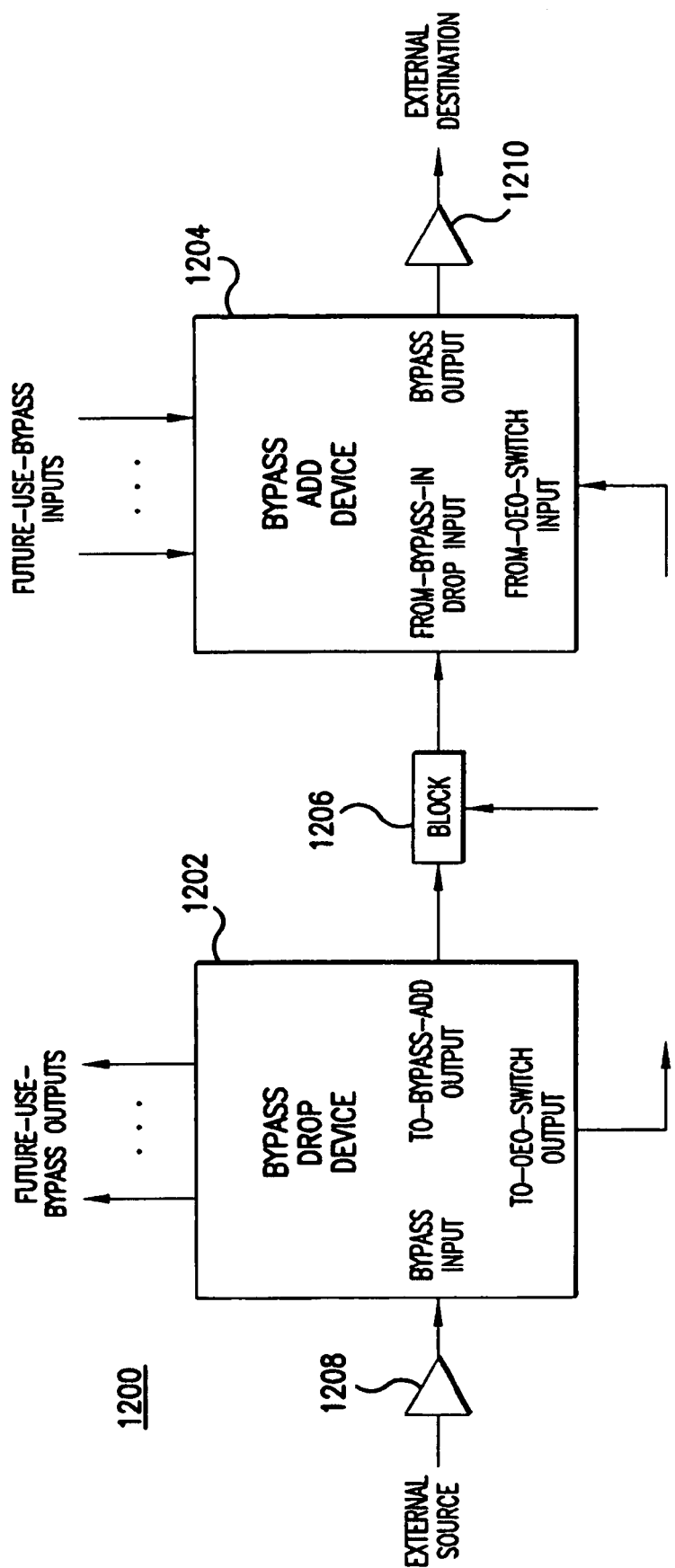
FIG. 12 illustrates a bypass insertion apparatus of an embodiment of the present invention.

The upgrade from FIG. 11 to FIG. 11A make take place by inserting the bypass insertion apparatus 1200 as shown in FIG. 12. The bypass insertion apparatus 1200 may include a bypass drop device 1202, a bypass add device 1204, and optionally a blocking filter 1206.

The bypass drop device 1202 may include a bypass input, a to-OEO-switch output, future-use-bypass output(s), and a to-bypass-add output. The bypass drop device 1202 may be configured to direct optical signals present at its bypass input to each of the to-OEO-switch output, the future-use-bypass output(s), and the to-bypass-add output. The bypass input of the bypass drop device 1202 may optically communicate with an external optical signal source.

The bypass add device 1204 may include a bypass output, a from-OEO-switch input, future-use-bypass input(s), and a from-bypass-drop input. The bypass add device 1204 may be configured to direct optical signals present at each of its from-OEO-switch input, the future-use-bypass input(s), and the from-bypass-drop input to its bypass output. The bypass output of the bypass add device 1204 may optically communicate with an external optical signal destination.

The to-bypass-add output of the bypass drop device 1202 may optically communicate with the from-bypass-drop input of the bypass add device 1204. The optical communication between may take place via the blocking filter 1206. If present, the input of the blocking filter 1206 may optically communicate with the to-bypass-add output of the bypass drop device 1202 and the output of the blocking filter 1206 may optically communicate with the from-bypass-drop input of the bypass add device 1204. The blocking filter 1206 may be configured to direct a subset of optical channels present at is input to its output (see BF 900 of FIG. 9) and the blocking filter 1206 may be reconfigurable (see RBF 902 of FIG. 9).

Further, the bypass insertion apparatus 1200 may optionally include a bypass in-line amplifier 1208 or a bypass boost amplifier 1210 or both. The bypass in-line and boost amplifiers 1208, 1210 may be configured to amplify optical signals present at the respective inputs and direct the amplified optical signals to the respective outputs. When present, the input and the output of the bypass in-line amplifier 1208 may optically communicate with the external optical signal source and the bypass input of the bypass drop device 1202, respectively. Likewise when present, the input and the output of the bypass boost amplifier 1210 may optically communicate with the output of the bypass add device 1204 and the external optical signal destination, respectively.

Figure 13:
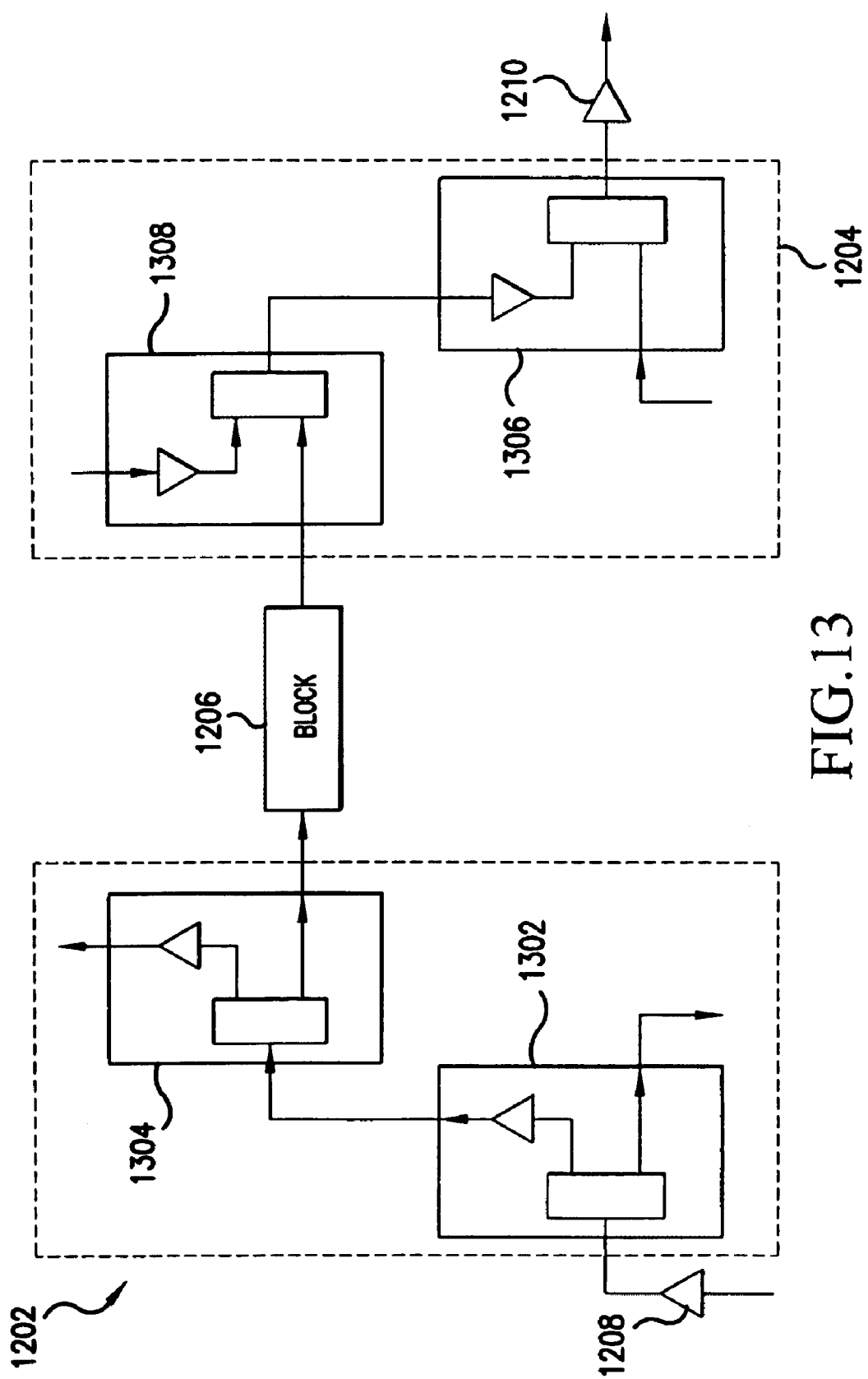
FIG. 13 illustrates a more detailed implementation of the bypass insertion apparatus of an embodiment of the present invention.

FIG. 13 illustrates an embodiment of a particular implementation 1300 of the bypass insertion apparatus 1200. In this embodiment, the bypass drop device 1202 (of FIG. 12) may include first and second drop taps 1302, 1304. Each of the first and second drop taps 1302, 1304 of the bypass drop device 1202 may be of the type of drop tap 500 or 510 (see FIG. 5A or 5B). In this particular embodiment, both the first and second drop taps 1302, 1304 are shown as being of the type of drop tap 500 of FIG. 5A.

Each of the drop taps 1302, 1304 may be configured to direct optical signals at the respective inputs to the respective first and second outputs. In this particular embodiment, the input of the first drop tap 1302 may optically communicate with the bypass input of the bypass drop device 1202, the first output of the first drop tap 1302 may optically communicates with the to-OEO-switch output of the bypass drop device 1202, the second output of the first drop tap 1302 may optically communicate with the input of the second drop tap 1304, the first output of the second drop tap 1304 may optically communicate with the to-bypass-add output of the bypass drop device 1202, and the second output of the second drop tap 1304 may optically communicate with the future-use-bypass output of the bypass drop device.

Also in this embodiment, the bypass add device 1204 (of FIG. 12) may include first and second add taps 1306, 1308. Each of the first and second add taps 1306, 1308 of the bypass add device 1204 may be of the type of add tap 600 or 610 (see FIG. 6A or 6B). In this particular embodiment, both the first and second add taps 1306, 1308 are shown as being of the type of add tap 600 of FIG. 6A.

Each of the first and second add taps 1306, 1308 of the bypass add device 1204 may be configured to direct optical signals present at both its first and second inputs to its output. In this particular embodiment, the first input of the first add tap 1306 may optically communicate with the from-OEO-switch input of the bypass add device 1204, the second input of the first add tap 1306 may optically communicate with the output of the second add tap 1308, the first input of the second add tap 1308 may optically communicate with the from-bypass-drop input of the bypass add device 1204, and the second input of the second add tap 1306 may optically communicate with the future-use-bypass input of the bypass add device 1204.

As noted above, each of the drop taps 1302, 1304 may be of the type of drop tap 500 or 510 and each of the add taps 1306, 1308 may be of the type of add tap 600, 610. That is, the drop taps 1302 and/or 1304 may include an optical splitter and may also include line amplifier(s). Likewise, the add taps 1306 and/or 1308 may include a combiner and line amplifier(s). The details of the drop and add taps have already been described with references to FIGS. 5A, 5B, 6A, and 6B and thus need not be repeated here.

Thus, the method of upgrading an OEO node to a higher degree OEO node where the original OEO node has not been pre-enabled for bypass upgrade, for example from OEO node of FIG. 11 to the OEO node of FIG. 11A simply requires inserting the appropriate bypass insertion apparatus and making proper optical connections.

Referring back to FIG. 11A, the upgrade method may be accomplished by enabling optical communication between the bypass input of the bypass drop device 1202 with the external optical source; enabling optical communication between the to-OEO-switch output of the bypass drop device 1202 with the input of the OEO node; enabling optical communication between the bypass output of the bypass add device 1204 with the external optical destination; enabling optical communication between the from-OEO-switch output of the bypass add device 1204 with the output of the OEO node; enabling optical communication between the to-bypass-add output of the bypass drop device 1202 to a from-bypass-drop input of the bypass add device 1204.

Optionally, the method may further include inserting a blocking filter 1206 and configuring the blocking filter 1206 if it is a reconfigurable blocking filter.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. An optical-electrical-optical (OEO) node to pre-enable bypass upgrade, comprising:

an OEO switch including first and second inputs and first and second outputs, the OEO switch configured to receive optical signals on its first and second inputs, electrically process the received optical signals, and optically output the processed signals to its first and second outputs;

first and second drop taps, wherein each of the drop taps includes an input and first and second outputs, and wherein each of the drop taps is configured to direct optical signals present at the input to both the first and second outputs;

first and second add taps, wherein each of the add taps includes first and second inputs and an output, and wherein each of the add taps is configured to direct optical signals present at both the first and second inputs to the output, wherein the first output of the first drop tap optically communicates with the first input of the OEO switch, the first output of the second drop tap optically communicates with the second input of the OEO switch, the first input of the first add tap optically communicates with the first output of the OEO switch, and the first input of the second add tap optically communicates with the second output of the OEO switch;

a bypass device, wherein the bypass device comprises:

a drop tap or an add tap, wherein the drop tap of the bypass device includes an input and first and second outputs and is configured to direct optical signals present at the input to both the first and second outputs, and wherein the add tap of the bypass device includes first and second inputs and an output and is configured to direct optical signals present at both the first and second inputs to the output; and a blocking filter including an input and output, wherein the blocking filter is configured to direct a subset of optical channels of optical signals present at its input to its output, and wherein the input of the blocking filter optically communicates with the output of the drop tap of the bypass device, or the output of the blocking filter optically communicates with the input of the add tap of the bypass device.

2. The OEO node of claim 1, further comprising:
an in-line amplifier,
wherein the in-line amplifier includes an input and an output and is configured to amplify optical signals present at its input and direct the amplified optical signals to its output, and
wherein
the output of the in-line amplifier optically communicates with the input of the first drop tap, or
the output of the in-line amplifier optically communicates with the input of the second drop tap.

3. The OEO node of claim 1, further comprising:
a boost amplifier,
wherein the boost amplifier includes an input and an output and is configured to amplify optical signals present at its input and direct the amplified optical signals to its output, and
wherein
the input of the boost amplifier optically communicates with the output of the first add tap, or
the input of the boost amplifier optically communicates with the output of the second add tap.

4. The OEO node of claim 1, wherein at least one of the first and second drop taps comprises:
a splitter with an input and first and second outputs,
wherein the splitter is configured to direct optical signals present at its input to both its first and second outputs,
wherein the input of the at least one of the first and second drop taps optically communicates with the input of the splitter, and
wherein the first and second outputs of the splitter optically communicates with the first and second outputs of the at least one of the first and second drop taps, respectively.

5. The OEO node of claim 4, wherein the splitter of the at least one of the first and second drop taps is configured to deliver a majority of output power to the first output of the splitter.

6. The OEO node of claim 5, wherein the at least one of the first and second drop taps further comprises:
a line amplifier including an input and an output,
wherein the line amplifier is configured to amplify optical signals present at its input and direct the amplified optical signals to its output,
wherein the input of the line amplifier optically communicates with the second output of the splitter, and
wherein the output of the line amplifier optically communicates with the second output of the at least one of the first and second drop taps.

7. The OEO node of claim 4, wherein the splitter of the at least one of the first and second drop taps is such that an amount of output power of the optical signals directed to each of the first and second outputs of the splitter is tunable.

8. The OEO node of claim 1, wherein at least one of the first and second add taps comprises:
a combiner with first and second inputs and an output,
wherein the combiner of the at least one of the first and second add taps is configured to direct optical signals present at its first and second inputs to its output, and
wherein the first and second inputs of the at least one of the first and second add taps optically communicates with the first and second inputs of the combiner, respectively, and wherein the output of the combiner optically communicates with the output of the at least one of the first and second add taps.

9. The OEO node of claim 8, wherein the at least one of the first and second add taps further comprises:
a line amplifier including an input and an output,
wherein the line amplifier is configured to amplify optical signals present at its input and direct the amplified optical signals to its output,
wherein the output of the line amplifier optically communicates with the second input of the combiner, and
wherein the second input of the at least one of the first and second add taps optically communicates with the input of the line amplifier.

10. The OEO node of claim 8, wherein the at least one of the first and second add taps further comprises:
a line amplifier including an input and an output,
wherein the line amplifier is configured to amplify optical signals present at its input and direct the amplified optical signals to its output,
wherein the output of the combiner optically communicates with the input of the line amplifier, and
wherein the output of the line amplifier optically communicates with the output of the at least one of the first and second add taps.

11. The OEO node of claim 8, wherein the combiner of the at least one of the first and second add taps is such that an amount of power of optical signals from each of the first and second inputs and directed to the output of the combiner is tunable.

12. The OEO node of claim 1,
wherein the bypass device includes a bypass input, a bypass output, a local input, and a local output,
wherein the bypass device is configured to
direct zero or more optical channels of the optical signals present at the bypass input to the bypass output,
direct the optical signals present at the bypass input to the local output, and
direct optical signals present at the local input to the bypass output, and
wherein
the bypass input of the bypass device optically communicates with the second output of the first drop tap and the bypass output of the bypass device optically communicates with the second input of the first add tap, or
the bypass input of the bypass device optically communicates with the second output of the second drop tap and the bypass output of the bypass device optically communicates with the second input of the second add tap.

13. The OEO node of claim 12, wherein
within the bypass device,
the first output of the drop tap optically communicates with the bypass output of the bypass device, the input of the drop tap optically communicates with the bypass input of the bypass device, and the second output of the drop tap optically communicates with the local output of the bypass device, or
the first input of the add tap optically communicates with the bypass input of the bypass device, the second input of the add tap optically communicates with the local input of the bypass device, and the output of the add tap optically communicates with the bypass output of the bypass device.

14. The OEO node of claim 13,
wherein the blocking filter of the bypass device is a reconfigurable blocking filter and includes a control input, and
wherein the reconfigurable blocking filter of the bypass device is configured to adjust a selection of the subset of the optical channels to be directed from its input to its output.

15. The OEO node of claim 14, wherein the add tap of the bypass device comprises:
a combiner with first and second inputs and an output and configured to direct optical signals present at both its first and second inputs to its output,
wherein the first input of the combiner optically communicates with the output of the blocking filter, and
wherein the output of the combiner optically communicates with the output of the add tap of the bypass device.

16. The OEO node of claim 15, wherein the add tap bypass device further comprises:
a line amplifier including an input and an output configured to amplify optical signals present at its input and direct the amplified optical signals to its output,
wherein the output of the line amplifier optically communicates with the second input of the combiner, and
wherein the input of the line amplifier optically communicates with the second input of the add tap of the bypass device.

17. The OEO node of claim 15, wherein the add tap of the bypass device further comprises:
a line amplifier including an input and an output configured to amplify optical signals present at its input and direct the amplified optical signals to its output,
wherein the input of the line amplifier optically communicates with the output of the combiner, and
wherein the output of the line amplifier optically communicates with the output of the add tap of the bypass device.

18. The OEO node of claim 12, wherein the drop tap of the bypass device comprises:
a splitter with an input and first and second outputs and configured to direct optical signals present at its input to both the first and second outputs,
wherein the input of the splitter optically communicates with the input of the drop tap of the bypass device, and
wherein the first output of the splitter optically communicates with the first output of the drop tap of the bypass device.

19. The OEO node of claim 18, wherein the drop tap of the bypass device further comprises:
a line amplifier including an input and an output configured to amplify optical signals present at its input and direct the amplified optical signals to its output,
wherein the input of the line amplifier optically communicates with the second output of the splitter of the bypass device, and
wherein the output of the line amplifier optically communicates with the second output of the drop tap of the bypass device.

20. An optical bypass insertion apparatus to pre-enable future bypass upgrades, comprising:
a bypass drop device including a bypass input, a to-OEO-switch output, a future-use-bypass output, and a to-bypass-add output, wherein the bypass drop device is configured to direct optical signals present at its bypass input to its to-OEO-switch output, future-use-bypass output, and to-bypass-add output;
a bypass add device including a bypass output, a from-OEO-switch input, a future-use-bypass input, and a from-bypass-drop input, wherein the bypass add device is configured to direct optical signals present at its from-OEO-switch input, future-use-bypass input, and from-bypass-drop input to its bypass output,
wherein the to-bypass-add output of the bypass drop device optically communicates with the from-bypass-drop input of the bypass add device; and
a blocking filter including an input and output, wherein the blocking filter is configured to direct a subset of optical channels of optical signals present at its input to its output,
wherein the to-bypass-add output of the bypass drop device optically communicates with the input of the blocking filter and the output of the blocking filter optically communicates with the from-bypass-drop input of the bypass add device.

21. The optical bypass insertion apparatus of claim 20,
wherein the blocking filter is a reconfigurable blocking filter and includes a control input, and
wherein the reconfigurable blocking filter is configured to adjust a selection of the subset of the optical channels to be directed from its input to its output.

22. The optical bypass insertion apparatus of claim 20, further comprising:
a bypass in-line amplifier or a bypass boost amplifier,
wherein each of the bypass in-line amplifier and the bypass boost amplifier includes an input and an output and is configured to amplify optical signals present at its input and direct the amplified optical signals to its output, and
wherein
the output of the bypass in-line amplifier optically communicates with the input of the bypass drop device, or
the input of the bypass boost amplifier optically communicates with the bypass output of the bypass add device.

23. The optical bypass insertion apparatus of claim 20, wherein the bypass drop device comprises:
first and second drop taps,
wherein each of the first and second drop taps includes an input and first and second outputs and is configured to direct optical signals present at the input to both the first and second outputs,
wherein the input of the first drop tap optically communicates with the bypass input of the bypass drop device,
wherein the first output of the first drop tap optically communicates with the to-OEO-switch output of the bypass drop device,
wherein the second output of the first drop tap optically communicates with the input of the second drop tap,
wherein the first output of the second drop tap optically communicates with the to-bypass-add output of the bypass drop device, and
wherein the second output of the second drop tap optically communicates with the future-use-bypass output of the bypass drop device.

24. The optical bypass insertion apparatus of claim 23, wherein at least one of the first and second drop taps of the bypass drop device comprises:
a splitter with an input and first and second outputs,
wherein the splitter is configured to direct optical signals present at its input to its first and second outputs, wherein the input of the at least one of the first and second drop taps optically communicates with the input of the splitter, and wherein the first and second outputs of the splitter optically communicates with the first and second outputs of the at least one of the first and second drop taps, respectively.

25. The optical bypass insertion apparatus of claim 24, wherein the splitter of the at least one of the first and second drop taps of the bypass drop device is configured to deliver a majority of output power to the first output of the splitter.

26. The optical bypass insertion apparatus of claim 25, wherein the at least one of the first and second drop taps of the bypass drop device further comprises:

a line amplifier including an input and an output, wherein the line amplifier is configured to amplify optical signals present at its input and direct the amplified optical signals to its output, wherein the input of the line amplifier optically communicates with the second output of the splitter of the at least one of the first and second drop taps, and wherein the output of the line amplifier optically communicates with the second output of the at least one of the first and second drop taps.

27. The optical bypass insertion apparatus of claim 24, wherein the splitter of the at least one of the first and second drop taps of the bypass drop device is such that an amount of output power of the optical signals directed to each of the first and second outputs of the splitter is tunable.

28. The optical bypass insertion apparatus of claim 20, wherein the bypass add device comprises:

first and second add taps, wherein each of the first and second add taps includes first and second inputs and an output and is configured to direct optical signals present at both its first and second inputs to its output, wherein the first input of the first add tap optically communicates with the from-OEO-switch input of the bypass add device, wherein the second input of the first add tap optically communicates with the output of the second add tap, wherein the first input of the second add tap optically communicates with the from-bypass-drop input of the bypass add device, and wherein the second input of the second add tap optically communicates with the future-use-bypass input of the bypass add device.

29. The optical bypass insertion apparatus of claim 28, wherein the at least one of the first and second add taps of the bypass add device comprises:

a combiner with first and second inputs and an output, wherein the combiner is configured to direct optical signals present at its first and second inputs to its output, and wherein the first and second inputs of the at least one of the first and second add taps optically communicate with the first and second inputs of the combiner, respectively, and wherein the output of the combiner optically communicates with the output of the at least one of the first and second add taps.

30. The optical bypass insertion apparatus of claim 29, wherein at least one of the first and second add taps of the bypass add device further comprise:

a line amplifier including an input and an output, wherein the line amplifier is configured to amplify optical signals present at its input and direct the amplified optical signals to its output, wherein the output of the line amplifier optically communicates with the second input of the combiner of the at least one of the first and second add taps, and wherein the second input of the at least one of the first and second add taps optically communicates with the input of the line amplifier.

31. The optical bypass insertion apparatus of claim 29, wherein the at least one of the first and second add taps of the bypass add device further comprises:

a line amplifier including an input and an output, wherein the line amplifier is configured to amplify optical signals present at its input and direct the amplified optical signals to its output, wherein the output of the combiner of the at least one of the first and second add taps optically communicates with the input of the line amplifier, and wherein the output of the line amplifier optically communicates with the output of the at least one of the first and second add taps.

32. The optical bypass insertion apparatus of claim 29, wherein the combiner of the at least one of the first and second add taps of the bypass add device is such that an amount of power of optical signals from each of the first and second inputs and directed to the output is tunable.

33. A method of upgrading an optical-electrical-optical (OEO) node to a higher degree OEO node, wherein the OEO node has been enabled for bypass upgrade and includes a bypass drop output and a bypass add input, the method comprising:

inserting an bypass device such that a bypass input of the bypass device optically communicates with the bypass-drop output of the OEO node and a bypass output of the bypass device optically communicates with the bypass-add input of the OEO node, wherein the bypass device includes the bypass input, the bypass output, a future-use-bypass input, and a future-use-bypass output, wherein the bypass device directs zero or more optical channels of the optical signals present at the bypass input to the bypass output, directs the optical signals present at the bypass input to the future-use-bypass output, and directs optical signals present at the future-use-bypass input to the bypass output, and wherein the bypass device comprises:

a drop tap or an add tap, wherein the drop tap of the bypass device includes an input and first and second outputs and is configured to direct optical signals present at the input to both the first and second outputs, and wherein the add tap of the bypass device includes first and second inputs and an output and is configured to direct optical signals present at both the first and second inputs to the output; and a blocking filter including an input and output, wherein the blocking filter is configured to direct a subset of optical channels of optical signals present at its input to its output, and wherein the input of the blocking filter optically communicates with the output of the drop tap of the bypass device, or the output of the blocking filter optically communicates with the input of the add tap of the bypass device.

34. The method of claim 33, further comprising:

adjusting a selection of optical channels to be directed from the bypass input to the bypass output of the bypass device.

35. A method of upgrading an optical-electrical-optical (OEO) node to a higher degree OEO node, wherein an input of the OEO node optically communicates with an external optical signal source and an output of the OEO node communicates with an external optical destination, the method comprising:

enabling optical communication between a bypass input of a bypass drop device with the external optical source;

enabling optical communication between a to-OEO-switch output of the bypass drop device with the input of the OEO node;

enabling optical communication between a bypass output of a bypass add device with the external optical destination;

enabling optical communication between a from-OEO-switch output of the bypass add device with the output of the OEO node;

enabling optical communication between a to-bypass-add output of the bypass drop device to a from-bypass-drop input of the bypass add device, wherein the bypass drop device includes the bypass input, the to-OEO-switch output, a future-use-bypass output, and the to-bypass-add output and is configured to direct optical signals present at its bypass input to its to-OEO-switch output, future-use-bypass output, and to-bypass-add output, and wherein the bypass add device includes the bypass output, the from-OEO-switch input, a future-use-bypass input, and the from-bypass-drop input and is configured to direct optical signals present at its from-OEO-switch input, future-use-bypass input, and from-bypass-drop input to its bypass output; and inserting a blocking filter, which is configured to direct a subset of optical channels of optical signals present at its input to its output, such that the input of the blocking filter optically communicates with the to-bypass-add output of the bypass drop device and the output of the blocking filter optically communicates with the from-bypass-drop input of the bypass add device.

36. The method claim 35, wherein the blocking filter is a reconfigurable blocking filter configured to adjust a selection of the subset of the optical channels to be directed from its input to its output, the method further comprising:

adjusting a selection of optical channels to be directed from the input to the output of the blocking filter.

* * * * *